Aug. 14, 1956  F. C. TEA, JR  2,758,756
FEEDER

Filed Nov. 2, 1953  2 Sheets-Sheet 1

INVENTOR.
FRANK C. TEA JR.
BY Toulmin & Toulmin
ATTORNEYS

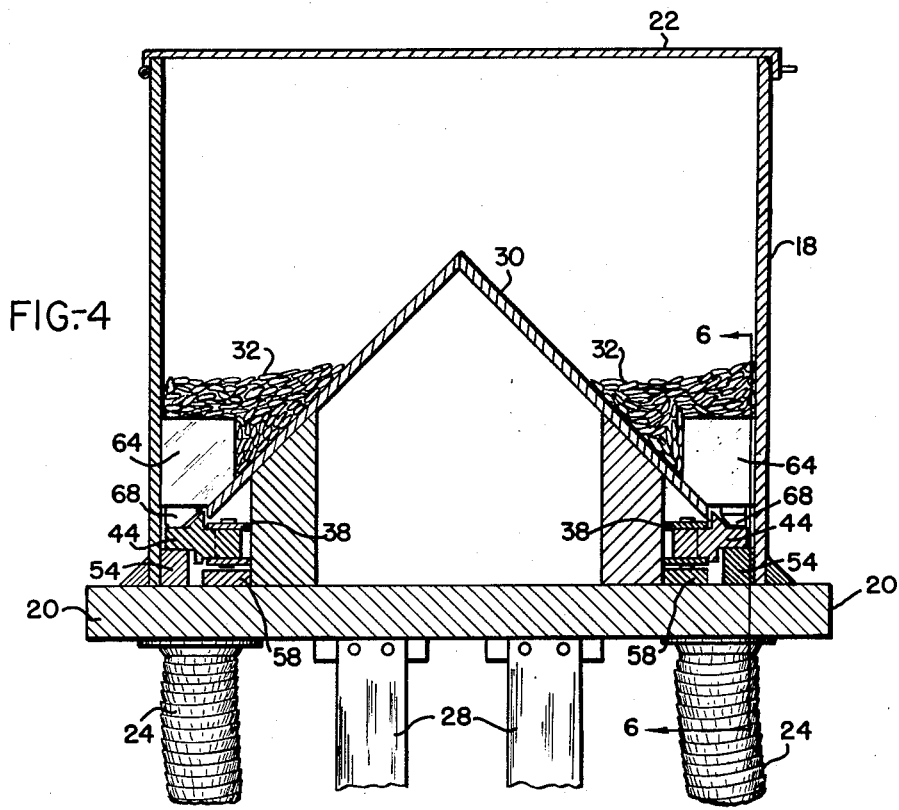
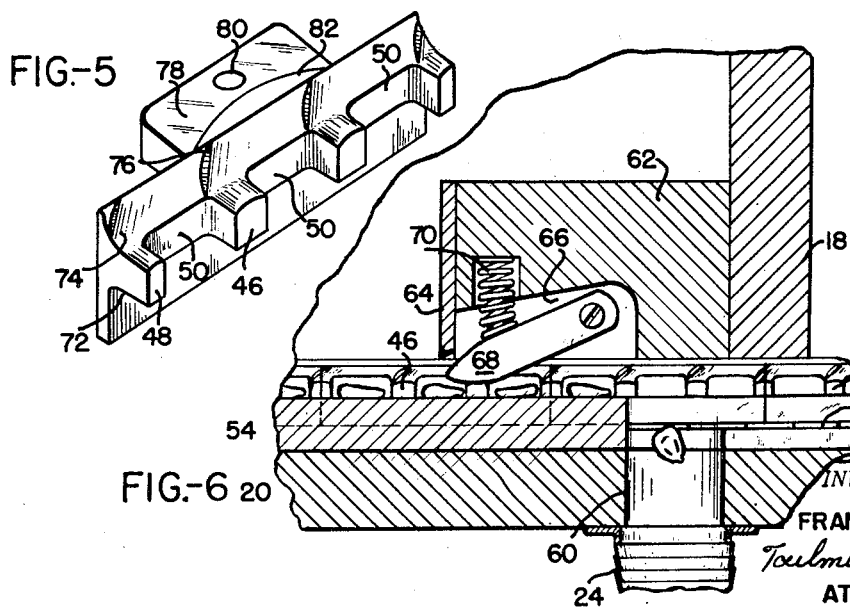

United States Patent Office 2,758,756
Patented Aug. 14, 1956

2,758,756

FEEDER

Frank C. Tea, Jr., Bellevue, Ohio

Application November 2, 1953, Serial No. 389,763

11 Claims. (Cl. 222—270)

This invention relates to seeders and the like, particularly to seeders of the type utilized for planting corn and like grains.

The conventional seeding device for corn and the like consists of two or more cylindrical hopper means in which the grain to be planted is placed, and with a feeding mechanism being arranged at the bottom of each hopper consisting of a rotary plate that delivers grain to a feed tube leading downwardly to a furrow opener.

Such seeding devices are generally satisfactory for low speed operation, but the modern practice, with practically all implements being tractor-drawn, is to carry out all operations at a much higher speed than was formerly possible. Under these circumstances it has been found that the conventional type seeder, using a cylindrical hopper and a rotary plate, is at fault in that it misses a large number of hills whenever it is operated above a predetermined fairly low speed.

Having the foregoing in mind, it is a particular object of this invention to provide a seeding device for corn and the like which can be operated at a very high speed without missing hills.

Another object of the present invention is the provision of a seeding device which can be operated at high speed without missing hills, and which includes an extremely large hopper means so that it is not necessary to refill the hopper means at the frequent intervals that is now necessary.

Another object of the present invention is the provision of a seeding device embodying a new principle of delivering seeds which is capable of operation at any desired speed.

A still further object is the provision of a seeding device for seeding corn and the like which can be made as large or as small as possible without any substantial change in the structure.

These and other objects and advantages of this invention will become more apparent upon reference to the following specification taken in connection with the accompanying drawings, wherein:

Figure 4 is a transverse vertical sectional view indicated by line 4—4 on Figure 2;

Figure 5 is a perspective view showing one of the feed members carried by the endless chain of the seeding device; and Figure 6 is a fragmentary sectional view indicated by line 6—6 on Figure 4.

Figure 1:
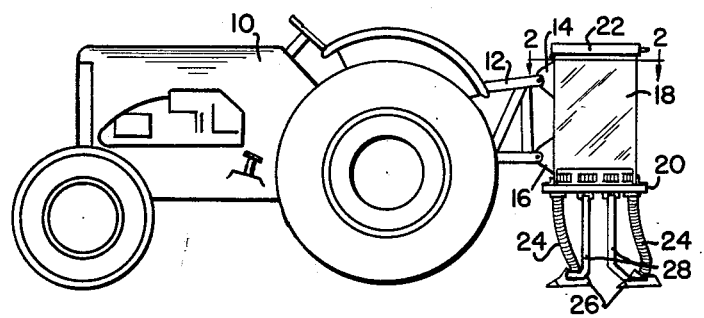
Figure 1 is a side elevational view, more or less diagrammatic, of a tractor having a seeding device according to my invention.

Referring to the drawings somewhat more in detail, in Figure 1 is a tractor 10 having a lift-type tractor hitch 12 which is attached as by the bracket means 14 and 16, with the front wall of a hopper 18 of a seeding device constructed according to my invention.

The seeding device comprises a bottom wall 20 and a hinged lid 22 at the top. Flexible feed pipes 24 extend downwardly from bottom wall 20 to furrow openers 26 which are supported as by elements 28 on the seeding device.

Figure 2:
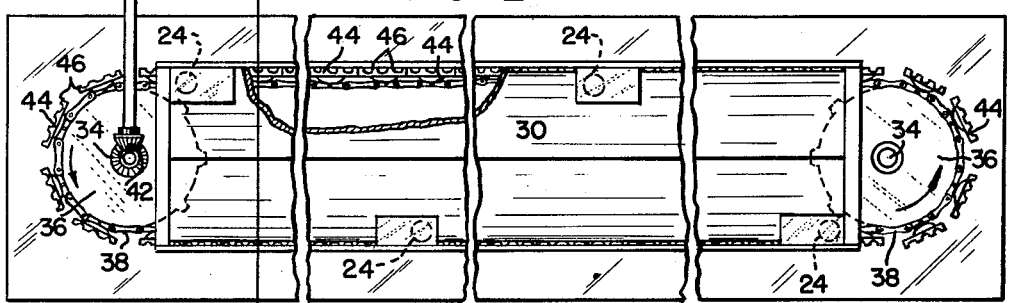
Figure 2 is a plan sectional view indicated by line 2—2 on Figure 1.
Figure 3:
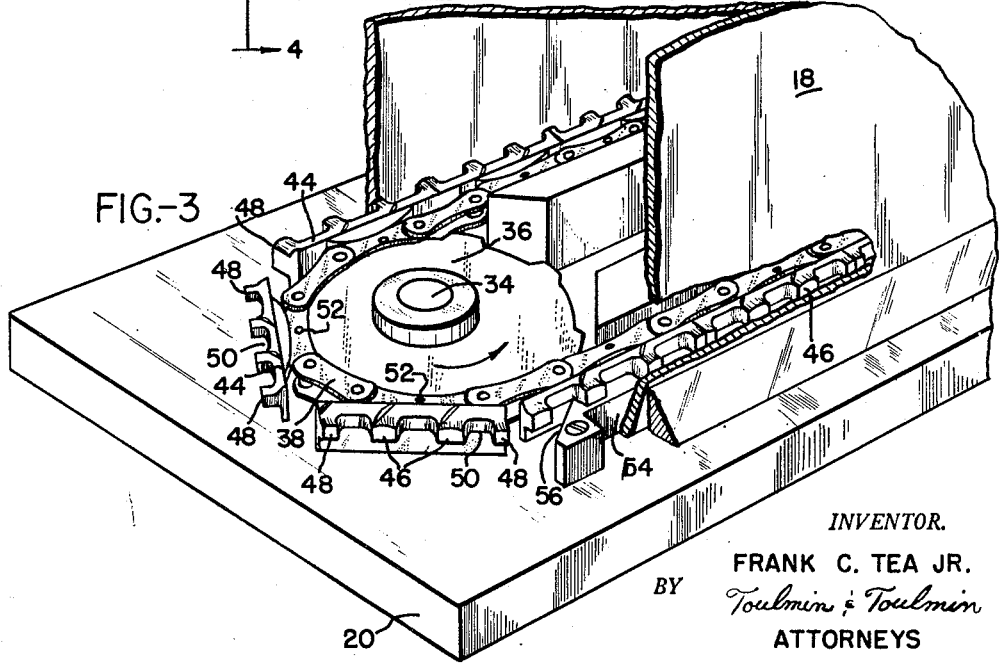
Figure 3 is a perspective view looking in at one end of the seeding device and partly broken away to show the construction thereof.

Turning now to Figures 2, 3 and 4, it will be seen that within hopper 18 there is a V-shaped member 30 extending the length of the hopper and providing for inclined bottom means within the hopper so that the grain therein as at 32 is continuously delivered to the front and back walls of the hopper.

At opposite ends of hopper 18 there are provided shafts 34 on which are mounted sprockets 36, and passing about sprockets 36 and extending in straight reaches therebetween immediately inwardly of the front and back walls of hopper 18 is an endless chain 38.

A shaft as at 40 and bevel gears 42 may be provided for driving the chain from the power take-off of the tractor, or, if preferred, the seeding device may be provided with a ground wheel for driving the sprockets and endless chain.

Mounted on chain 38 as, for example, on every other link thereof as will be seen in Figure 3, are the feed members 44 which comprise spaced outwardly extending teeth 46, with the two teeth 48 at the opposite ends being half the size of the other teeth so that along the straight reaches of chain 38 the members 44 abut end to end and form a series of uniformly spaced pockets 50 between the teeth of the feed members for receiving the seed that is to be delivered by the seeding device.

As will best be seen in Figures 3, 4, 5 and 6, the feed members 44, which are pivotally and detachably connected with the links of chain 38 as by the pins 52, are of about the same width in the vertical direction as chain 38. The teeth 46 and 48 of the feed members, however, are considerably narrower than the chain, and on each side of the hopper there is provided the removable filler bar 54 extending the length of the hopper and engaging the bottom surfaces of the teeth of the feed members. At the side of the hopper, at each end thereof where the chain enters the hopper, the filler bars 54 are provided with tapered ends 56 thereby facilitating getting the feed members on the chain into position as the chain commences its straight movement through the hopper.

The principal purpose of the filler bars 54 is to adapt the seeding device to various sizes of grain and to permit various numbers of individual grains to be dropped in each end. This is done by selecting feed members so that the pockets 50 thereof are of the size to receive the desired number of grains to be delivered to each hill. The filler bars 54 are then selected so as to fill the space between the bottom of the feed members and the bottom wall 20 of the hopper.

As will be seen in Figure 2, there are provided four of the flexible pipes 24 extending downwardly from the bottom of the hopper whereby the arrangement is suitable for planting four rows at one time. It will be evident, however, that the device could also comprise merely two of the flexible feed pipes, one at each end of tthe hopper, and a conventional two-row planter arrangement could be provided.

In any case, as will be seen in Figure 6, there is mounted over each of the apertures 60 in bottom wall 20, which communicate with the open upper ends of the flexible feed pipes 24, a block 62 having a front wall 64 extending downwardly into close proximity with the upper surface of the travelling feed members so that only that seed is drawn beneath the block that is located within the pockets of the feed members. Each block 62 has in its underneath side a recess 66, and pivoted therein is a finger 68 pressed downwardly by a spring 70 so that the said finger clicks along the top of the teeth of the feed members as they pass beneath the block. This arrangement insures that the seed is properly located within the pockets and is loose therein so that it will freely fall through the aperture 60 when the pocket aligns therewith.

As will be seen in Figure 5, the teeth 46 and 48 of the feed members have substantially a right angle corner on the underneath side as at 72 which rides along the filler bars 54, whereas the upper side of the feed members is formed upwardly in a somewhat arcuate configuration as at 74 with inclined guide surfaces at 76 which facilitates in delivering the seed into the pockets between the teeth. Figure 5 also shows the shank 78 on the back of each feed member, which is provided with an aperture 80 for receiving the pins 52 by which the feed members are secured to the links of the chain 38. Preferably, each shank 78 comprises an upstanding portion 82 for engaging the side edge of the link to which the feed member is attached, thus preventing the feed member from wobbling from about its connection with the chain as the feed members pass around the sprockets 36.

From the foregoing it will be perceived that I have provided by my invention a new type of feeding mechanism for corn and the like, and in particular any grains or other crops that are to be planted in spaced relation in rows, with my device being of such a nature that it can operate at extremely high speed while still feeding properly at all times. The high speed of operation is possible because the chain has a long straight travel through a supply of the seed to be delivered before it reaches each of the feed openings, thus giving plenty of opportunity for the seed to fall into the feed pockets of the feed members.

As contrasted to rotary type seeders, there is no high centrifugal force tending to throw the seed out of the pockets, and a seeder according to this invention can, therefore, operate at the maximum speed desired.

The seeding device has been shown arranged to plant corn and the like in continuous rows, with no relationship between adjacent rows, as is the case when the corn is checked. This is, in general, the modern practice, but it will be evident that if it were desired to check plant corn or a similar crop, this could be done by way of check wires and the like similar to what are employed in connection with conventional corn planters.

It will also be evident that the seeding device, while not particularly designed therefor and having certain limitations in that respect, could be employed for delivering fertilizer or other dry granular soil treating material in the same manner as it delivers seed.

A possible arrangement in this connection would be the provision of a longitudinal partition within the hopper, with seed being placed in one side of the hopper and a fertilizer material placed in the other side, and with one and the same chain serving on one of its straight reaches to feed seed and on the other of its straight reaches to feed fertilizer. In this case the fertilizer would probably be delivered to the same furrow openers as the seed for a more efficient utilization thereof.

It will be understood that this invention is susceptible to modification in order to adapt it to different usages and conditions, and, accordingly, it is desired to comprehend such modifications within this invention as may fall within the scope of the appended claims.

I claim:

1. In a seeder; a hopper having a straight wall, a chain extending through said hopper adjacent said wall and parallel thereto, a plurality of feed members detachably and flexibly carried on said chain in end to end relation on the wall side of the chain and having spaced teeth extending to the wall to form feed pockets, said hopper having a bottom inclined downwardly toward said wall and spaced therefrom so seed in the hopper will be delivered to the tops of said feed members, said hopper having a bottom wall with an aperture over which said feed pockets pass, a guard member in said hopper closing the tops of said feed openings in the region of said aperture while leaving the majority of said feed pockets along said straight wall open to receive seed, and spring pressed means within said guard member bearing on top of said feed members and adapted for at least partially entering said feed pockets during movement of said chain.

2. In a seeder; a hopper having a straight wall, a chain extending through said hopper adjacent said wall and parallel thereto, feed members flexibly and detachably mounted in end to end relation on said chain between the chain and the wall and having spaced teeth extending to the wall to form feed pockets, said hopper having a bottom inclined downwardly to the outer edge of said chain so that seed placed in the hopper will be delivered to the tops of said feed members, said hopper having a bottom wall with an aperture over which said feed pockets pass so seed in the pockets will drop through the aperture, a guard member within said hopper closing the tops of said pockets in the region of said aperture while leaving the majority of said feed pockets along said straight wall open to receive seed, a finger pivotally mounted within said guard member and having its end bearing on top of said feed members, and spring means urging said finger downwardly so that it will enter each of said feed pockets as the chain moves in said hopper.

3. In a seeder; a hopper having straight front and back walls, a chain running through said hopper and having a straight reach therein adjacent each of said straight walls and parallel thereto, feed members detachably and movably carried on said chain in end to end relation between the chain and the said walls and having spaced teeth projecting outwardly to the walls to form feed pockets, said hopper having a bottom therein inclined downwardly toward each side wall and terminating in the region of the outer edges of the said straight reaches of chain so that seed placed in the hopper will be delivered to the tops of said feed members, means for driving said chain, said hopper having a bottom wall with an aperture beneath said feed pockets at the end of each of said straight reaches of chain at the end of the travel of the chain along the pertaining wall, and a guard member in the hopper above each said aperture closing the tops of the said feed pockets in the region of the said aperture, each said guard member covering only a minor portion of the feed pockets along the pertaining reach of chain whereby the majority of the pockets along each reach of chain are open to receive seed.

4. In a seeder; a bottom wall, spaced sprockets carried on top of said bottom wall rotatable on vertical axes, a chain passing around said sprockets, a plurality of feed members detachably and movably carried on the outside of said chain so as to be in end to end relation along the straight reaches of said chain, said feed members having fingers projecting outwardly therefrom, a hopper carried on said bottom wall having straight front and back walls engaging the tips of said teeth and having end walls extending between said front and back walls about the ends of said straight reaches of said chain, said hopper having a downwardly concave bottom therein extending between end walls and spaced inwardly from said front and back walls so seed placed in the hopper will be delivered to the tops of said feed members, said bottom wall being formed with an aperture beneath said feed members at the end of each of said straight walls where the chain exits from the hopper, a guard member within the hopper above each of said apertures covering the tops of the feed members, said guard members leaving the majority of the feed pockets along each reach of the chain exposed to receive seed, and means for driving at least one of said sprockets for actuating said chain.

5. In a seeder; a hopper having a straight side wall and a bottom wall, a chain extending through said hopper parallel to said side wall and adjacent thereto and also parallel to said bottom wall and adjacent thereto, feed members detachably mounted on said chain on the side thereof toward said wall and comprising teeth extending to said wall to form vertical feed pockets, the underneath side of said feed members being formed with a notch, and a filler bar detachably mounted in the corner of the hopper where the side and bottom walls meet and extending into the notches on the bottom of said feed members thereby forming bottoms for said feed pockets.

6. In a seeder; a hopper having a straight side wall and a bottom wall, a chain extending through said hopper parallel to said side wall and adjacent thereto and also parallel to said bottom wall and adjacent thereto, feed members detachably mounted on said chain on the side thereof toward said wall and comprising teeth extending to said wall to form vertical feed pockets, the underneath side of said feed members being formed with a notch, and a filler bar detachably mounted in the corner of the hopper where the side and bottom walls meet and extending into the notches on the bottom of said feed members thereby forming bottoms for said feed pockets, said feed members being replaceable on said chain by other feed pockets having different size notches, and said filler bar being replaceable in said hopper by another of a different size whereby a different combination of said members and filler bar can be employed to provide feed pockets of a different size.

7. In a seeder; a hopper having end walls and straight front and back walls and a bottom wall, a chain extending through said hopper adjacent said front and back walls and parallel thereto and also parallel to and adjacent said bottom wall, individual feed members on said chain on the wall side thereof having teeth extending to the wall to form vertical feed pockets, said hopper having a bottom portion therein which inclines downwardly toward said front and back walls for being spaced therefrom so that seed in the hopper will be delivered to the tops of said feed members, apertures in the bottom wall of said hopper over which said feed pockets pass so grain in the pockets will drop through said apertures, guard members in the hopper closing only those pockets in the region of said apertures while leaving the majority of the pockets open to receive seed, means for driving said chain, said feed members being notched on the bottom on the side thereof opposite the chain, and filler bar means detachably mounted in the hopper extending into said notches and running substantially the length of said hopper except in the region of said apertures, and said feed members being detachable from said chain.

8. In a seeder; a hopper having straight front and back walls, a chain running through said hopper and having a straight reach therein adjacent each of said straight walls and parallel thereto, feed members carried on said chain in end to end relation between the chain and the said walls and having spaced teeth projecting outwardly to the walls to form feed pockets, said hopper having a bottom therein inclined downwardly toward each side wall and terminating in the region of the outer edges of the said straight reaches of chain so that seed placed in the hopper will be delivered to the tops of said feed members, means for driving said chain, said hopper having a bottom wall with an aperture beneath said feed pockets at the end of each of said straight reaches of chain at the end of the travel of the chain along the retaining wall, a guard member in the hopper above each aperture closing only the tops of the said feed pockets in the region of the said aperture while leaving the majority of said pockets open to receive seed, said feed members being notched on the bottom sides on the side opposite the chain, filler bars detachably mounted in said hopper and extending along inside the front and back walls thereof and fitting in said notches to form bottoms for said feed pockets, and the end of each filler bar at the end thereof where the chain enters the hopper being beveled to align said feed members with each other as they enter the hopper, said feed members also being detachable from said chain.

9. In a seeder; a hopper for receiving the seed having a straight wall portion, a feed member extending horizontally through said hopper along said wall having feed pockets for receiving the seed therein, said hopper having a bottom wall with an aperture over which said feed pockets pass so seed will drop from the pockets through said aperture, and means in the hopper adjacent said wall closing the tops of the feed pockets in the region of said aperture, said means extending along only a fractional part of the length of said wall whereby said feed member has a substantial length of straight travel in said hopper in approaching said aperture whereby seed will drop into said pockets during high speed operation of said chain.

10. In a seeder; a hopper having a straight wall, a feed member extending through said hopper parallel to said wall and adjacent thereto, means on said feed member forming vertical feed pockets between the feed member and the wall, said hopper being provided with an opening in the bottom wall over which said feed pockets pass so seed in the pockets will drop through said aperture, and a member in said hopper adjacent said wall closing the tops of said pockets in the region of said aperture, said member extending along only a fractional part of said wall thereby to leave a substantial length of the feed member in the hopper exposed to enable seed to fall in the feed pockets during high speed operation of the feed member.

11. As a new article of manufacture; a feed member for being attached to a chain to be drawn through a hopper and comprising; a member having a shank on one side for extending into a link of the chain, and bored to receive a pin to connect the member to the link, and having spaced finger means extending from the other side forming feed pockets therebetween, the bottom surface of said feed member opposite the shank being notched so the feed member will slidably fit over a filler bar that forms a bottom for said feed pockets.

References Cited in the file of this patent
UNITED STATES PATENTS

| | | |
|---|---|---|
| 864,523 | Field | Aug. 27, 1907 |
| 1,039,806 | Robbins | Oct. 1, 1912 |
| 2,054,552 | Wakeham | Sept. 15, 1936 |
| 2,141,044 | Rossmann | Dec. 20, 1938 |
| 2,372,199 | Hassler | Mar. 27, 1945 |
| 2,567,204 | Hagenbook | Sept. 11, 1951 |
| 2,657,831 | Pierce | Nov. 3, 1953 |